(12) United States Patent
Hanelt et al.

(10) Patent No.: US 6,300,454 B1
(45) Date of Patent: Oct. 9, 2001

(54) LIQUID-CRYSTALLINE NEMATIC ORGANOSILOXANES WHICH CAN BE CROSSLINKED TO FORM OPTICALLY ANISOTROPIC POLYMER LAYERS

(75) Inventors: Eckhard Hanelt, Geltendorf; Frank Sandmeyer, Burghausen; Norman Häberle, München, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/357,455

(22) Filed: Jul. 20, 1999

(30) Foreign Application Priority Data

Jul. 23, 1998 (DE) .............................................. 198 33 258

(51) Int. Cl.[7] .......................... C08G 77/38; C08G 77/20; C08G 77/12

(52) U.S. Cl. ................................ 528/27; 528/31; 528/26; 528/25; 428/1.52; 428/1.23; 252/299.61; 252/299.62; 252/299.63; 252/299.68

(58) Field of Search ................................ 428/1.52, 1.23; 252/299.61, 299.62, 299.63, 299.68; 528/31, 27, 26, 25

(56) References Cited

U.S. PATENT DOCUMENTS

| | | |
|---|---|---|
| 4,859,031 | 8/1989 | Berman et al. . |
| 4,996,330 | 2/1991 | Scherowsky et al. . |
| 5,211,877 | 5/1993 | Andrejewski et al. . |
| 5,362,315 | 11/1994 | Muller-Rees et al. . |
| 5,502,206 | 3/1996 | Zahn et al. . |
| 5,506,704 | 4/1996 | Broer et al. . |
| 5,599,412 | 2/1997 | Faris . |
| 5,610,258 | 3/1997 | Weitzel et al. . |
| 5,641,850 | 6/1997 | Stohrer et al. . |
| 5,682,212 | 10/1997 | Maurer et al. . |
| 5,683,622 | 11/1997 | Kratzschmar et al. . |
| 5,688,436 | * 11/1997 | Ohnishi et al. . |
| 5,691,789 | 11/1997 | Li et al. . |
| 5,695,680 | 12/1997 | Weitzel et al. . |

FOREIGN PATENT DOCUMENTS

| | | |
|---|---|---|
| 43 42 280 A1 | 6/1995 | (DE) . |
| 44 08 171 A1 | 9/1995 | (DE) . |
| 196 19 460 A1 | 11/1997 | (DE) . |
| 0 617 111 A1 | 9/1994 | (EP) . |
| 0 709 445 A1 | 5/1996 | (EP) . |
| 0 711 780 A1 | 5/1996 | (EP) . |
| 0 626 386 A1 | 11/1994 | (JP) . |

OTHER PUBLICATIONS

Journal of Materials Chemistry, "Orientation effects in monodomain nematic liquid crystalline polysiloxane elastomers", Bd. 8, No. 1, Jan. 1, 1998, pp. 53–60.
Derwent Abstract corr. to DE–A 196 19 460 AN 98–000705.
Derwent Abstract corr. to DE–A 43 42 280 AN 95–216450.
Derwent Abstract corr. to DE–A 44 08 171 AN 95–321444.

* cited by examiner

*Primary Examiner*—Robert Dawson
*Assistant Examiner*—Kuo-Liang Peng
(74) *Attorney, Agent, or Firm*—Brooks & Kushman P.C.

(57) ABSTRACT

The invention relates to nematic organosiloxanes (F) having at least two mesogenic side groups, of which at most one has three nuclei and all the others have two nuclei, where the term nucleus is taken to mean a six-membered ring or a bicyclic structure consisting of six-membered rings, and where at least one of the mesogenic side groups contains a methacryloyl or acryloyl group.

24 Claims, No Drawings

LIQUID-CRYSTALLINE NEMATIC ORGANOSILOXANES WHICH CAN BE CROSSLINKED TO FORM OPTICALLY ANISOTROPIC POLYMER LAYERS

TECHNICAL FIELD

The present invention relates to organosiloxanes containing at least two mesogenic side groups, to their preparation, and to their use for the production of optically anisotropic layers.

BACKGROUND ART

Low-molecular-weight nematic compounds, which are widely used in liquid-crystal displays (LCDs), are distinguished by good alignability and switchability in an electric field. However, their aligned structure is not particularly stable without an electric field. With increasing warming, the nematic alignment decreases until finally an ordered structure is no longer present. By contrast, some applications, for example polarizing filters and retardation films, require materials whose nematic alignment is retained over a broad temperature range. In many cases, it is also preferred for the aligned structure to be fixed in a solid film instead of, as in the case of low-molecular-weight nematic compounds, for a liquid substance to be enclosed between substrates.

A known way of fixing liquid-crystalline properties is the binding of the liquid crystals into polymer networks, for example by subsequent crosslinking of aligned liquid-crystalline side-chain polymers. However, liquid-crystalline side-chain polymers are generally more difficult to align than low-molecular-weight liquid crystals owing to their higher viscosity, which generally increases with increasing molecular weight. Cholesteric siloxanes are examples of liquid-crystalline side-chain polymers which can be easily aligned. U.S. Pat. No. 5,211,877 describes easily aligned compounds based on cyclic organosiloxanes having side chains containing cholesterol and methacryloyl groups. However, replacement of cholesterol by a compound containing two phenyl radicals only induces a material having a smectic SA phase and secondary amounts of a more highly ordered SB phase. This material is difficult to align and is therefore unsuitable for the proposed applications.

U.S. Pat. No. 5,610,258 discloses that according to the art, neither organosiloxanes having various types of side groups, each containing two aromatic or cycloaliphatic radicals, nor organosiloxanes having identical mesogenic side groups each containing more than two aromatic or cycloaliphatic radicals, are easy to align and at the same time exhibit a broad nematic phase. In contrast, the patent discloses cyclic organosiloxanes having at least three different mesogenic side groups per organosiloxane, where at least two mesogenic side groups per organosiloxane contain at least three aromatic, heteroaromatic and/or cycloaliphatic radicals. These organosiloxanes are said to be readily alignable side-chain polymers having a broad nematic phase. The synthesis of the compounds described proceeds via a large number of separate steps and is too complex for an industrial process. Production of optically anisotropic layers from these materials, to be complete within an acceptable time in production terms, produces only hazy, optically anisotropic layers.

SUMMARY OF INVENTION

The object of the present invention is to provide compounds which are simple to synthesize on a large scale, can easily be converted into a state with nematic alignment, and which can be used to produce clear, optically anisotropic layers by subsequent crosslinking.

DETAILED DESCRIPTION OF THE INVENTION

The invention relates to nematic organosiloxanes (F) having at least two mesogenic side groups, of which at most one has three nuclei and all the others have two nuclei, where the term "nucleus" (and its plural "nuclei") is taken to mean a six-membered ring or a bicyclic structure consisting of six-membered rings, and where at least one of the mesogenic side groups contains a methacryloyl or acryloyl group.

Surprisingly, and in contrast to the current state of knowledge, these organosiloxanes (F) have liquid-crystalline phases over a broad temperature range, and good nematic alignability, enabling optically anisotropic layers to be easily produced therefrom.

Suitable nuclei are six-membered homocyclic or heterocyclic rings, such as, for example, phenyl rings, cyclohexyl rings, pyran rings, pyridine rings, pyrimidine rings or dioxane rings, and bicyclic systems consisting of six-membered rings, such as naphthalene systems. This list is exemplary and not limiting.

In the nematic organosiloxanes (F), the proportion of mesogenic side groups containing methacryloyl or acryloyl groups is preferably at least 10 mol %, particularly preferably at least 40 mol % based on the total mol of mesogenic side groups. The methacryloyl or acryloyl groups on the mesogenic side groups are preferably terminal.

The nematic organosiloxanes (F) are preferably those which contain at least two identical or different units of the general formula (1)

$$[MR^1_p SiO_{q/2}] \qquad (1)$$

in which, independently of one another in each case, either p=1 and q=2 or p=2 and q=1, $R^1$ is a $C_1$- to $C_{10}$-hydrocarbon radical, such as the methyl, ethyl, n-propyl, n-butyl, n-pentyl, n-hexyl, n-heptyl, n-octyl, n-nonyl or n-decyl radical, or the phenyl radical, and in which M is a mesogenic side group of the general formula (2)

$$R^2—X^1—(A^1—X^2)_a—R^3—A^2 \qquad (2)$$

where, in the above formula (2), $R^2$ is a radical of the formula $(CH_2)_n$, where n is an integer having a value of from 2 to 10 and in which one or more methylene units which are not adjacent to one another may be replaced by oxygen atoms or dimethylsilyl radicals, $R^3$ is a chemical bond or a radical of the formula $(CH_2)_m$, where m is an integer having a value of from 1 to 12, in which one or more methylene units which are not adjacent to one another may be replaced by oxygen atoms or dimethylsilyl radicals, $X^1$ is a chemical bond or is selected from divalent radicals from the group consisting of —O—, —COO— and —OCO—, $X^2$ are identical or different linking groups which are selected, independently of one another, from the group consisting of a chemical bond and divalent radicals —COO—, —OCO—, —CH,CH$_2$—, —CH=N—,

—N=CH—, —N=N—, —CONH—, —HN(O)C—, —C≡C—, —CH=CH—, —N=N(O)— and —N(O)=N—, $A^1$ are identical or different nuclei which are selected, independently of one another, from divalent radicals 1,4-phenylene, 1,4-cyclohexylene, 2,5-pyridinylene, 2,5-pyranylene, 2,5-pyrimidinylene, 5,2-pyrimidinylene, 2,5-(1,3-dioxanylene), 5,2(1,3-dioxanylene), 2,6-naphthylidene, 2,7-naphthylidene and 1,4-naphthylidene, $A^2$ is an end group which is selected from the group consisting of hydrogen atoms, halogen atoms, hydroxyl, phenyl, acryloyloxy, (meth)acryloyloxy, (meth)acrylethyleneoxy, cyclohexyl and $C_1$- to $C_{10}$-alkenyl radicals, in which one or more methylene units which are not adjacent to one another may be replaced by oxygen atoms or dimethylsilyl radicals, and a can adopt a value of 2 or 3.

Besides the units of the general formula (1), the organosiloxanes (F) can preferably contain units of the formulae $R^1{}_2Si$ and $R^1{}_3Si$. Preferred end groups are trimethylsilyl groups.

Particularly preferred organosiloxanes (F) of the general formula (1) are substituted cyclotetrasiloxanes, cyclopentasiloxanes, tetramethyldisiloxanes, and linear polymethylsiloxanes, preferably containing from 2 to 15 silicon atoms, and having trimethylsilyl groups as end groups. Particularly preferred radicals $R^1$ are methyl radicals.

Organosiloxanes (F) in which one mesogenic side group has three nuclei are particularly suitable for the production of optically anisotropic layers, since the use of trinuclear mesogens causes an increase in the clearing point and contributes toward stabilization of the nematic phase.

It has been found that the introduction of the —COO— or —OCO— group as radical $X^2$ promotes the formation of a homogeneous nematic phase without the interfering presence of crystalline components or other phases.

Particularly preferred organosiloxanes (F) contain at least two units of the general formula (1) containing mesogenic side groups of the general formula (3)

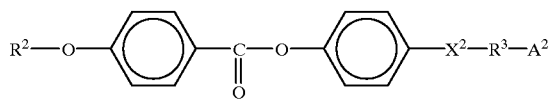
(3)

where $R^2$, $X^2$, $R^3$ and $A^2$ are as defined as in formula (2).

Very particularly preferred mesogenic side groups containing two or three aromatic radicals of the general formula (3) which contain no methacryloyl or acryloyl groups are those of the general formula (4)

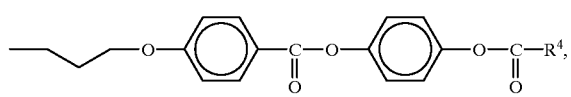
(4)

in which $R^4$ is a $C^1$- to $C_{10}$-alkyl, $C_1$- to $C_{10}$-haloalkyl, cyclohexyl, phenyl, 4-($C_1$- to $C_{10}$-)alkylphenyl, 4-($C_1$- to $C_6$-)alkoxyphenyl or 2-naphthyl radical.

Very particularly preferred mesogenic side groups which contain a methacryloyl or acryloyl group are those of the general formula (5)

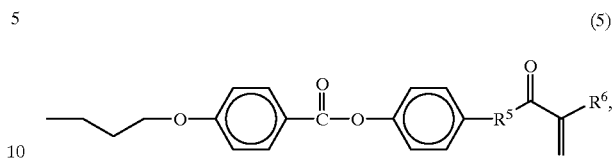
(5)

in which $R^5$ is an oxygen atom or an oxy-($C_1$- to $C_{11}$-)alkyleneoxy radical, in which one or more methylene units which are not adjacent to one another or to oxygen may be replaced by oxygen atoms, and $R^6$ is a hydrogen atom or a methyl radical.

The organosiloxanes (F) can be synthesized by reacting organosiloxanes containing at least two silicon atoms to which hydrogen atoms are bonded directly with alkenes, of which at most one contains three nuclei and all the others have two nuclei, where the term nucleus is taken to mean a six-membered ring or a bicyclic system consisting of six-membered rings, and where at least one of the alkenes contains a methacryloyl or acryloyl group.

In a preferred process for the preparation of organosiloxanes (F) of the above general formula (1), organosiloxanes containing at least two units of the general formula (6)

$[HR^1{}_pSiO_{q/2}]$ (6)

in which, independently of one another, either p=1 and q=2, or p=2 and q=1,
are reacted with alkenes containing mesogenic radicals, of the general formula (7)

$R^7—X^1—(A^1—X^2)_a—R^3—A^2$ (7)

or particularly preferably with alkenes containing mesogenic radicals, of the general formula (8)

(8)

where, in the above general formulae (6), (7) and (8),
$R^1$, $R^3$, $X^1$, $X^2$, $A^1$, $A^2$ and a are as defined in general formulae (1) and (2), and
$R^7$ is a radical of the formula $H_2C=CH—(C_kH_{2k-1})$, where k is an integer having a value of from 1 to 8 and in which one or more methylene units which are not adjacent to one another may be replaced by oxygen atoms or dimethylsilyl radicals.

The reaction of organosiloxanes of the general formula (6) containing hydrogen atoms bonded directly to silicon with alkenes of the general formula (7) or (8) having mesogenic properties is carried out in a manner known per se, for example by hydrosilylation in solvents, such as hydrocarbons, ethers or esters, using metals or platinum-group compounds as catalyst. Suitable hydrosilylation processes are described, for example, in U.S. Pat. No. 5,211,877.

In order to produce the optically anisotropic layers, either organosiloxanes (F) or mixtures of organosiloxanes (F) with one another or with other liquid-crystalline or non-liquidcrystalline materials can be employed so long as these additional mixture components do not hinder the formation of the nematic phase.

Preferred additional mixture components are compounds of the general formula (9) or (10)

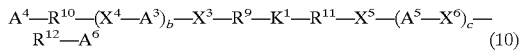

where, in the above general formulae (9) and (10), $R^3$, $X^1$, $X^2$, $A^1$, $A^2$ and a are as defined under the general formula (2), $R^8$ is selected from the group consisting of acryloyloxy, (meth)acryloyloxy and (meth)acryloylethyleneoxy radicals, $C_1$- to $C_{10}$-alkenyl radicals and the group of radicals having the formula $H_2C=CH—(C_jH_{2j-1})$, where j is an integer having a value of from 1 to 8 and in which one or more methylene units which are not adjacent to one another may be replaced by oxygen atoms or dimethylsilyl radicals, $K^1$ is selected from the group consisting of dianhydrohexitol derivatives and in particular dianhydrosorbide or dianhydromannitol, $R^9$, $R^{10}$, $R^{11}$ and $R^{12}$, independently of one another, are as defined for $R^3$, $X^3$ and $X^5$, independently of one another, are as defined for $X^1$, $X^4$ and $X^6$, independently of one another, are as defined for $X^2$, $A^3$ and $A^5$, independently of one another, are as defined for $A^1$, $A^4$ and $A^6$ are identical or different radicals selected from the group consisting of hydrogen atoms, halogen atoms, hydroxyl, nitrile, acryloyloxy, (meth)acryloyloxy, (meth)acrylolylethyleneoxy, cyclohexyl and $C_1$–$C_{10}$-alkenyl radicals, in which one or more methylene units which are not adjacent to one another may be replaced by oxygen atoms or dimethylsilyl radicals, and b and c, independently of one another, can adopt the value 2, 3 or 4.

The optically anisotropic layers are preferably produced by a process in which organosiloxanes (F) or an LC mixture containing these liquid-crystalline organosiloxanes (F) is applied to a substrate, aligned and subsequently fixed by a chemical crosslinking reaction. The optically anisotropic layers are particularly preferably produced using liquid-crystalline organosiloxanes of the general formula (1) and mixtures of these organosiloxanes with compounds of the general formulae (9) and (10).

The organosiloxanes (F) or an LC mixture containing these liquid-crystalline organosiloxanes can be applied to the substrate surface in solution or as a solvent-free dry substance above the glass point, for example by spin coating, using a doctor blade or using a roller. If a solvent is used for the application, this must be removed in a subsequent drying step.

The thickness of the dry LC layer on the substrate depends on the requirements of the particular application. If the layer is used, for example, as a retardation plate, the thickness is the quotient of the requisite optical retardation and the optical anisotropy of the aligned LC layer. The thickness of the dry LC layer is preferably from 1 μm to 500 μm, particularly preferably from 1 μm to 50 μm.

The application and the alignment of the LC mixture can be carried out fully continuously, semicontinuously or batchwise. A fully continuous process is described in U.S. Pat. No. 5,362,315.

The LC layer may be covered by a second substrate. The alignment of the mesogens is carried out, for example, by shearing the material during application or, for example, after application through the interaction of the mesogens with the appropriately selected substrate surface(s) or by an electric field.

The alignment of the LC mixture is preferably carried out in a temperature range from above the glass point to below the commencement of clearing of the respective LC mixture. In order to enable a simple industrial process, the composition of the LC mixture is preferably adjusted so that the alignment temperature suitable for the production process is between 20° C. and 150° C.

If the alignment of the mesogens is to be carried out through interaction with the substrate surface(s), then, in order to improve the aligning effect, a suitable alignment layer can be applied to the substrate surface(s) by known coating, printing or immersion processes, which are described in large number in the literature. The alignment layers or the substrates can be given a surface structure which favors alignment through additional treatment, for example rubbing. A local change in the alignment direction is possible, for example, by known processes for structuring the alignment layer by means of irradiation with polarized UV light. Suitable processes for achieving a tilt between the mesogens on the liquid-crystalline phase and its interfaces are likewise described in the literature, for example vapor deposition of inorganic materials at an oblique angle. In order to achieve a tilt of the mesogens at an angle of from 10° to 80° relative to the substrate surface, a layer of silicon oxide is particularly preferably applied by vapor deposition.

The substrates used can be all materials which are known for the production of optical elements. Preference is given to organic or inorganic substrates which are transparent or semitransparent in the wavelength range which is relevant for the particular application. The substrates can be planar or curved. Particular preference is given to substrates which do not change their physical properties at the temperature of production, processing and use of the LC layers. Particular preference is given to glass or quartz plates and polymer films, such as, for example, polycarbonates, polysulfones, polyethylene terephthalates and polyimides. If necessary, the substrate(s) can be provided with an additional alignment aid, such as, for example, a layer of polyimide, polyamide, polyvinyl alcohol or a silicon oxide.

After alignment, the liquid-crystalline organosiloxanes (F) or the LC mixtures containing these liquid-crystalline organosiloxanes (F) are fixed in the optically anisotropic layers. To this end, the organosiloxanes (F) are three-dimensionally crosslinked. This crosslinking is preferably effected by means of free radicals generated by peroxides, by UV light, by high-energy electromagnetic radiation, or thermally. However, the crosslinking can also be effected by means of crosslinking agents containing hydrogen atoms bonded directly to silicon with catalysis by platinum-metal catalysts. It can also take place cationically or anionically. Particular preference is given to crosslinking by UV light, which is described in U.S. Pat. No. 5,211,877.

The resulting fixed layer can be used together with the substrate in the form of a laminate, as a film open on one side or, after removal of the substrate(s), also as a free film. Preference is given to the use as a film together with the substrate or as a film open on one side.

Another application form of the optically anisotropic layers according to the invention are optically anisotropic plates, which are also referred to below as LC plates. U.S. Pat. No. 5,362,315 discloses how pigments having a liquid-crystalline structure with a chiral phase which produces a colored reflection of light can be produced by detaching a polymerized cholesteric film from a substrate and subsequently comminuting the resultant rough pieces. The pigments can then be incorporated into a suitable binder system and applied to a substrate. DE-A-196 19 460 describes how plates of negative refractive-index anisotropy for visible light can be produced by a similar process and used. The layers described here can also be comminuted to give optically anisotropic plates in a similar manner and subsequently applied, in a binder, to a substrate.

For the production of the LC plates, preference is given to liquid-crystalline organosiloxanes (F) of the general formula (1) and mixture components of the general formulae (9) and (10).

Coherent films of the layers of liquid-crystalline organosiloxanes (F) can be employed for all purposes for which optically anisotropic layers of positive refractive-index anisotropy are suitable, for example as optical retarder films for improving the properties of liquid-crystal displays. Liquid-crystal displays are described in numerous literature references. Depending on the choice of substrates and alignment layers and the composition of the organosiloxanes (F) and the LC mixtures containing these organosiloxanes (F), it is possible to achieve various forms of alignment, which can be advantageously used, for example, in liquid-crystal displays such as TN or STN displays. Examples of possible alignments of the mesogens in the layers according to the invention are homogeneous and planar alignment of all mesogens, hybrid alignment, in which the alignment changes continuously from planar to homeotropic from one surface to the opposite surface, fully homeotropic alignment of all mesogens or a planar alignment which is twisted about the surface perpendicular, in which the mesogens are aligned, for example, by doping with a chiral agent or by mutually twisted alignment layers, in a similar manner to a TN or STN cell.

A slight modification of the process described above for the production of the optically anisotropic layers allows further applications to be achieved. For example, absorptive polarizing filters can be produced if a mixture is used which, in addition to the organosiloxanes (F), also contains suitable dye molecules which align along the mesogens, but do not prevent the formation of the liquid-crystalline phase.

Optical storage media, which are based on a local change in refractive index, can be produced by effecting a local change in the alignment of the mesogenic radicals of the liquid-crystalline organosiloxane (F) before the crosslinking. This can be achieved, for example, by local UV crosslinking through a UV-opaque mask if the external alignment forces or the temperature of the LC layer is changed between the individual exposure steps. Another possibility is structuring of the alignment layer, as is used, for example, in LC production for generating subpixels.

In a mixture with materials which induce a chiral nematic phase (chiralics), the organosiloxanes (F) or an LC mixture containing these liquid-crystalline organosiloxanes can be used to produce polarization- and wavelength-selective optical filters or LC plates.

Such cholesteric liquid crystals (CLCs) reflect circular-polarized electromagnetic radiation in a wavelength range which is dependent on the helical structure of the CLC. The chiralics generate, in the nematic phase, either a right- or left-handed twisted structure which reflects circular-polarized light with the same helicity. The central wavelength of the reflection band, which is referred to below as the reflection wavelength, is determined by the refractive index and the pitch of the helical structure, which decreases with increasing concentration of the chiralic. In addition, the reflection wavelength is dependent on the viewing angle. The width of the band is determined by the optical anisotropy of the mesogenic radicals of the liquid-crystalline organosiloxanes (F) and the other mixture components. In most cases, it is between 5% and 15% of the reflection wavelength. For specific applications, a varying pitch of the helical structure, which results in an additionally broadened reflection band, can be generated by suitable measures during film production, as described, for example, in U.S. Pat. No. 5,506,704 and U.S. Pat. No. 5,691,789.

A large number of suitable optically active dopants are described in the literature. For left-handed helical materials, recourse is frequently made to cholesterol compounds, which, in addition to chirality, also bring with them sufficiently mesogenic properties to generate a stable mesophase. Examples of suitable compounds are the cholesterol derivatives disclosed by H. Finkelmann, H. Ringsdorf et al., in Makromol. Chem. 179, 829–832 (1978) or the tartarimide derivatives disclosed in U.S. Pat. No. 4,996,330. In the preparation of right-handed helical systems, recourse has hitherto generally been made to nonsteroidal systems, but these usually do not have good mesophase stability. A suitable right-handed helical steroid system based on cholest-8(14)-en-3-ol (doristerol) or derivatives thereof is described in U.S. Pat. No. 5,695,680. DE-A-43 42 280 and DE-A-44 08 171 describe cross-linkable, monomeric hexitol derivatives and mixtures of monomeric hexitol derivatives with other liquid-crystalline compounds which are employed as monomeric dopants for the production of cholesteric networks. DE-A-196 19 460 describes liquid-crystalline mixtures which contain liquid-crystalline organosiloxanes and dianhydrohexitol derivatives as left- or right-handed helical chiral additives. The dianhydrohexitol derivatives described therein are preferably compounds from the group consisting of dianhydrosorbide, dianhydromannitol and dianhydroiditol.

Such CLC mixtures containing organosiloxanes (F) and chiralics can be used as starting materials in the above-described process to produce layers with cholesteric alignment which reflect circular-polarized light wavelength selectively. In these applications, the thickness of the LC layer is preferably from more than three times the pitch up to a maximum layer thickness of 500 $\mu$m. Particular preference is given to layer thicknesses of from 1 $\mu$m to 50 $\mu$m.

Such layers with cholesteric alignment are highly suitable for decorative applications if the concentration of the chiralics is selected so that the reflection wavelength of the cholesteric band is in the visible wavelength region. Owing to the viewing angle-dependent color impression and the metallic sheen, these layers facilitate special color effects. In applications in security printing and mark protection, these color effects and the polarization of the reflected light mean that good copy protection is also achieved.

An example of an optical application is a planar CLC filter, as described in U.S. Pat. No. 4,859,031. U.S. Pat. No. 5,682,212 describes how cholesteric liquid crystals enable wavelength- and polarization-selective elements which are optically imaging for visible light up to the near UV to be produced on curved substrates.

Possible forms of application of these optical elements are, for example, beam splitters, mirrors and lenses. The mixtures based on nematic liquid-crystalline organosiloxanes (F) which are used here are particularly preferably suitable, at a low concentration of the chiralics, for the production of cholesteric filters, which reflect circular-polarized light in the infrared region (IR), i.e. at wavelengths above the visible light region. Through the use of curved substrates, this enables, in particular, the production of optically imaging, wavelength- and polarization-selective elements in the IR region by the process described in U.S. Pat. No. 5,682,212.

Particular preference is given for many applications to IR-reflective CLC layers which are transparent and colorless in the region of visible light. To this end, the wavelength of the lower band edge is preferably above 750 nm. One application of these IR-CLC layers is, for example, in machine-readable inscriptions or markings which are invisible to the human eye, for example security markings on security papers or in mark protection. In these applications, circular polarization of the reflected IR radiation is particularly advantageous since this is a security feature which can only be reproduced with difficulty.

Another application of IR-reflective CLC layers is in colorless and transparent protective coatings against heat radiation, for example thermal protection glazing of buildings or vehicles. Since it is important in this application that, wherever possible, all the thermal radiation is reflected, it is preferred here to combine two layers of opposite direction of rotation of the cholesteric helix in order to reflect left- and right-handed helical polarization. Particular preference is given for this application to cholesteric layers having reflection wavelengths in the IR whose reflection band has additionally been broadened during film production, for example by the abovementioned measures for generating a varying pitch of the helical structure.

In some of the above-described applications of the optically anisotropic layers according to the invention, it is also possible to use a layer containing LC plates instead of a coherent film. The special optical effect of the liquid-crystalline organosiloxanes (F) can in this way be applied at much lower expense since the user can use conventional printing and coating technologies instead of carrying out the more complex production of the films according to the invention himself, which requires an alignment and crosslinking process. To this end, the LC plates can, as described, for example, in U.S. Pat. No. 5,362,315 or U.S. Pat. No. 5,683,622, be incorporated into a suitable binder system. The requisite properties of the binder systems, in particular the optical properties, are dependent on the intended application of the LC plates.

In applications which utilize the polarization- and wavelength-selective reflection of LC plates containing chiral additives, preference is given to binders which are optically transparent at least in the region of the reflection wavelength. For applications which utilize the optical anisotropy in the region of visible light, preferred binders are colorless and transparent in the entire visible region.

For optical elements, preference is given to binder systems whose mean refractive index after curing is similar to the mean refractive index of the LC plates. For the production of durable layers containing LC plates, curable binder systems are preferably suitable. For specific applications, however, non-curable binders, such as, for example, oils and pastes, can also be used. Particular preference is given to binder systems which only modify the physical properties of the LC plates in a defined manner, or not at all.

Suitable binder systems are, for example, polymerizable resins (UP resins, silicone resins and epoxy resins), dispersions, solvent-containing paints or water-based paints, polymerizable LC silicones and all transparent plastics, for example polyvinyl chloride, polymethyl methacrylate and polycarbonate. Besides these isotropic binders, it is also possible to use liquid-crystalline systems as binders, for example liquid-crystalline polymers or polymerizable liquid-crystalline resins, and polymerizable LC silicones.

In order to produce a layer or a film having specific optical properties, the LC plates are stirred into a liquid binder. The alignment of the plates parallel to the surface of the layer takes place as in painting with liquid-crystalline colored pigments, for example as described in U.S. Pat. No. 5,362,315 on application of a thin layer of the pigment/binder mixture to a substrate or during extrusion of the mixture. Depending on the requirements of the particular application and properties of the binder, the film can be detached from the substrate after curing.

The applications of the LC plates according to the invention can, like the films, be restricted to a pure phase retardation of electromagnetic waves from the ultraviolet to the infrared region or, if a mixture containing additional components which induce a chiral nematic phase in addition to the organosiloxanes (F) is used for the production of the plates, LC plates having a liquid-crystalline structure with a chiral phase which reflect electromagnetic waves of a certain wavelength in a circular-polarized manner can also be produced therefrom, as described in U.S. Pat. No. 5,362,315. An example of the use of the LC plates according to the invention is the production of optically imaging, wavelength- and polarization-selective elements on curved substrates, as described in U.S. Pat. No. 5,683,622.

The LC plates are particularly suitable for decorative purposes if the concentration of the chiralics is selected so that the reflection wavelength of the cholesteric band is in the visible wavelength region. In the case of applications in security printing and mark protection, the viewing angle-dependent color impression and the polarization of the reflected light are additional security features. In the case of the simultaneous use of LC plates having a left- and right-handed helical structure, three-dimensional prints can be produced, as described in U.S. Pat. No. 5,599,412.

The LC plates can particularly advantageously be employed for the production of security markings for protection against counterfeiting of, for example, banknotes, security papers, documents or in mark protection since they can usually be incorporated relatively easily into the printing or other coating processes which already exist in these applications.

IR-reflective LC plates obtained at relatively low concentrations of chiralics are preferably transparent and colorless for such applications in the region of visible light. The wavelength of the lower band edge of the reflection band here is preferably above 750 nm. Such LC plates are suitable for producing markings which are invisible to the human eye but, owing to their good reflection in the IR region, can be recorded by equipment containing IR detectors. Besides the reflection wavelength, the circular polarization of the reflected radiation can also be detected as an additional security feature. For this application, the CLC plates are preferably applied in an IR-transparent binder to a substrate to be marked.

The invention will be illustrated by means of the examples below without being restricted thereto.

In these examples, unless stated otherwise, all amounts and percentages are by weight, all pressures are 0.10 MPa (abs.) and all temperatures are 20° C.

EXAMPLE 1

Alkenes of the general formula (7) were prepared by the following literature-described procedures:
p-hydroxybenzoic esters and 4-alkyl/alkoxyphenyl 4-(4'-allyloxybenzoyloxy)benzoates in accordance with U.S. Pat. No. 5,610,258, Examples 1a) and 1b).
4-Methacryloyloxyphenyl allyloxybenzoate in accordance with U.S. Pat. No. 5,610,258, Example 1c).
4-R-Phenyl 4-allyloxybenzoate in accordance with U.S. Pat. No. 5,610,258, Example 1d).

a) Further 1-(4-allyloxybenzoyloxy)-4-(alkanoyl/cycloalkanoyloxy)benzenes were synthesized by the following procedure:

1.5 equivalents of alkane-, chloroalkyl- or cycloalkanecarbonyl chloride were added dropwise to a 15% boiling solution of 1 equivalent of 4-hydroxyphenyl 4-allyloxybenzoate (abbreviated to ABH, prepared in accordance with U.S. Pat. No. 5,211,877) in toluene. When the addition of the respective acid chloride was complete, the solution was kept at the boiling point for a further 3 hours and then cooled to 90° C. Residual amounts of acid and acid chloride were removed by washing with the equivalent amount of aqueous sodium hydroxide solution in order to convert the acid chloride into the sodium salt of the corresponding acid, and the product was crystallized by cooling and adding petroleum ether (boiling range 100° C.–140° C.). The precipitate was separated by filtration, washed with petroleum ether (boiling range 100° C.–140° C.), and dried.

In detail, the compounds listed in Table 1 were prepared by this procedure with the stated yields and phase properties:

TABLE 1

(C = crystalline, I = isotropic, LC = liquid-crystalline phase)

| Name | Empirical formula | Phase transitions [° C.] | Yield [%] |
|---|---|---|---|
| 1-(4-Allyloxybenzoyloxy)-4-cyclohexanoyloxybenzene | $C_{23}H_{24}O_5$ | C 114 I | 89 |
| 1-(4-Allyloxybenzoyloxy)-4-octanoyloxybenzene | $C_{24}H_{28}O_5$ | C 63 LC 88 I | 86 |
| 1-(4-Allyloxybenzoyloxy)-4-butanoyloxybenzene | $C_{20}H_{20}O_5$ | C 83 LC 108 I | 89 |
| 1-(4-Allyloxybenzoyloxy)-4-hexanoyloxybenzene | $C_{22}H_{24}O_5$ | C 77 LC 101 I | 82 |
| 1-(4-Allyloxybenzoyloxy)-4-heptanoyloxybenzene | $C_{23}H_{26}O_5$ | C 62 LC 94 I | 87 |
| 1-(4-Allyloxybenzoyloxy)-4-(2-methoxyethoxy)benzene | $C_{20}H_{20}O_6$ | C 90 I | 82 |
| 1-(4-Allyloxybenzoyloxy)-4-(4-acetoxy)benzene | $C_{18}H_{16}O_5$ | C 108 I | 75 |
| 1-(4-Allyloxybenzoyloxy)-4-(4-(3-chloropropionyl)oxy)benzene | $C_{19}H_{17}O_5Cl$ | C 119 I | 85 |
| 1-(4-Allyloxybenzoyloxy)-4-(4-(3-bromopropionyl)oxy)benzene | $C_{19}H_{17}O_5Br$ | C 122 I | 87 |
| 1-(4-Allyloxybenzoyloxy)-4-(4-(4-chlorobutanoyl)oxy)benzene | $C_{20}H_{19}O_5Cl$ | C 80 I | 80 |
| 1-(4-Allyloxybenzoyloxy)-4-(4-(2-methoxyethyl)oxy)benzene | $C_{20}H_{20}O_6$ | C 90 I | 89 | b) Various 1-(4-allyloxybenzoyloxy)-4-(4'-R-benzoyloxy)benzenes were synthesized by the following procedure:

1.5 equivalents of unsubstituted or para-substituted benzoyl chloride were added dropwise to a 15% boiling solution of 1 equivalent of 4-hydroxyphenyl 4-allyloxy-benzoate (prepared in accordance with U.S. Pat. No. 5,211,877) in o-xylene. When the addition of the acid chloride was complete, the solution was held at the boiling point for a further 2 hours and then cooled to 20° C. The product crystallized out during cooling. The precipitate was filtered off, washed with o-xylene and dried.

In detail, the compounds listed in Table 2 were prepared by this procedure with the stated yields and phase properties:

TABLE 2

(C = crystalline, I = isotropic, LC = liquid-crystalline phase)

| Name | Empirical formula | Phase transitions [° C.] | Yield [%] |
|---|---|---|---|
| 1-(4-Allyloxybenzoyloxy)-4-benzoyloxybenzene | $C_{23}H_{18}O_5$ | C 135 LC 164 I | 94 |
| 1-(4-Allyloxybenzoyloxy)-4-(4'-methylbenzoyloxy)benzene | $C_{24}H_{20}O_5$ | C 157 LC 243 I | 89 |
| 1-(4-Allyloxybenzoyloxy)-4-(4'-methoxybenzoyloxy)benzene | $C_{24}H_{20}O_6$ | C 161 LC > 250 I | 87 |
| 1-(4-Allyloxybenzoyloxy)-4-naphthoyloxy)benzene | $C_{27}H_{20}O_5$ | C 154 I | 85 |

EXAMPLE 2

5.6 kg (14.7 mol) of 1-(4-allyloxybenzoyloxy)-4-cyclohexanoyloxybenzene and 1.6 kg (5.3 mol) of pentamethylcyclopentasiloxane were dissolved in 33 l of toluene, and 250 ppm of cyclooctadienylplatinum dichloride, based on the pentamethylcyclopentasiloxane, were added at 65° C. When the exothermic evolution of heat had subsided, the solution was stirred at 110° C. for 45 minutes. 3.3 kg (9.75 mol) of 4-methacryloyloxyphenyl allyloxybenzoate, a further 250 ppm of cyclootadienylplatinum dichloride and 21 g of the aluminum salt of N-nitrosophenylhydroxylamine (obtainable as Q1301 from Wako, Neuss) were then added, and the mixture was stirred at 80° C. for 4 hours. The product was precipitated at 20° C. using petroleum ether, and the precipitate was dissolved in toluene, fine-filtered and dried, giving 8.99 kg of an organosiloxane (87% of theory) having a nematic phase between a glass transition temperature of 31° C. and a clearing point of 100° C., and a viscosity of 11 Pas at 90° C.

A 25% solution of 6 kg of this organosiloxane in toluene was admixed with 1.2 kg (3.55 mol) of 4-methacryloyloxyphenyl allyloxybenzoate. The mixture was filtered and dried, giving 6.5 kg of an organosiloxane mixture (LC silicone 1) having a nematic phase between a glass transition temperature of 9° C. and a clearing point of 94° C., and a viscosity of 1 Pas at 90° C.

EXAMPLE 3

The LC silicone 1 from Example 2 was mixed with 0.5% by weight of 2-methyl-1-[4-(methylthio)phenyl]-2-morpholino-1-propanone (obtainable under the name Irgacure® 907 from Ciba-Geigy AG). Two glass plates were each provided with a polyvinyl alcohol alignment layer which had been rubbed unidirectionally with a velvet cloth. 0.1 g of the mixture was applied at 90° C. to the alignment layer of one of the glass plates and covered with the second plate in such a way that the rubbing directions were opposite and parallel. By means of even pressure on the plates, the mixture was distributed until an approximately 7 μm thick film remained between the alignment layers. The film was heated at 85° C. for 15 minutes until a monodomain having a homogeneous planar alignment was achieved and all the disclination lines had disappeared. It was subsequently polymerized by irradiation with UV-A light (approximately 100 mW/cm² for 15 seconds). The resultant colorless and clear film exhibited an optical path difference of 960 nm at a light wavelength of 633 nm using the Senarmont method.

EXAMPLE 4

121.32 g (0.3 mol) of 4-methoxyphenyl 4-(4'-allyloxybenzoyloxy)benzoate, (0.2 mol) of 4-methacryloyloxyphenyl allyloxybenzoate, 0.22 g of the aluminum salt of N-nitrosophenylhydroxylamine and 33.06 g (0.11 mol) of pentamethylcyclopentasiloxane were dissolved in 480 ml of toluene. The solution was heated to 70° C., 200 ppm of cyclopentadienylplatinum dichloride, based on the pentamethylcyclopentasiloxane, were added, and the mixture was stirred at 75° C. for 25 hours. After both 12 hours and 19 hours, 0.02 g of platinum catalyst were supplemented. The solvent was removed, the residue was dissolved in tetrahydrofuran, the product was precipitated using ethanol, and the precipitate was dried, giving 175.10 g (80% of theory) of an organosiloxane having a nematic phase between a glass transition temperature of 35° C. and a clearing point of 210° C.

EXAMPLE 5

42.12 g (0.113 mol) of 1-(4-allyloxybenzoyloxy)-4-benzoyloxybenzene, 31.42 g (0.113 mol) of 4-cyanophenyl allyloxybenzoate and 23.70 g (0.079 mol) of pentamethylcyclopentasiloxane were dissolved in 300 ml of toluene, and 200 ppm by weight of cyclopentadienylplatinum dichloride, based on pentamethylcyclopentasiloxane, were added at 100° C. The solution was stirred at 110° C. for 35 minutes and then cooled to 20° C., and 50.75 g (0.150 mol) of 4-methacryloyloxyphenyl allyloxybenzoate, 150 ppm by weight of cyclopentadienylplatinum dichloride, based on pentamethylcyclopentasiloxane, and 0.22 g of the aluminum salt of N-nitrosophenylhydroxylamine were added, the mixture was stirred at 75° C. for 11 hours, the product was precipitated from the cooled reaction solution using petroleum ether, and the precipitate was dried, giving 121.86 g (83% of theory) of an organosiloxane having a nematic phase between a glass transition temperature of 34° C. and a clearing point of 123° C.

EXAMPLE 6

17.0 g (0.045 mol) of 1-(4-allyloxybenzoyloxy)-4-benzoyloxybenzene and 7.2 g (0.024 mol) of pentamethylcyclopentasiloxane were dissolved in 45 ml of toluene, and 0.23 ml of a 1% solution of cyclopentadienylplatinum dichloride in methylene chloride was added at 80° C. The solution was stirred at 105° C. for 45 minutes and then cooled to 60° C., and 23.1 g (0.068 mol) of 4-methacryloyloxyphenyl allyloxybenzoate, 0.24 ml of 1% cyclopentadienylplatinum dichloride solution in methylene chloride, 45 ml of toluene and 46.88 mg of the aluminum salt of N-nitrosophenylhydroxylamine were added, and the mixture was stirred at 70° C. for 2 hours. The product was precipitated from the cooled reaction solution using petroleum ether. The precipitate was dissolved in toluene, fine-filtered and freeze-dried, giving 40.3 g (86% of theory) of an organosiloxane having a nematic phase between a glass transition temperature of 37° C. and a clearing point of 113° C. This organosiloxane was used to produce, as described in Example 3, an aligned and crosslinked layer with a thickness of approximately 5 μm. Full alignment was achieved after heating at 90° C. for 15 minutes. Between crossed polarizing filters, the colorless and clear film exhibited clear optical anisotropy with a dark position on parallel alignment of the rubbing direction of the alignment layer with one of the polarization axes.

EXAMPLE 7

37.44 g (0.1 mol) of 1-(4-allyloxybenzoyloxy)-4-benzoyloxybenzene and 10.52 g (0.035 mol) of pentamethylcyclopentasiloxane were dissolved in 75 ml of toluene, and 0.35 ml of a 1% solution of cyclopentadienylplatinum dichloride in methylene chloride was added at 80° C. The solution was stirred at 105° C. for 45 minutes and then cooled to 60° C., and 22.56 g (0.067 mol) of 4-methacryloyloxyphenyl allyloxybenzoate, 0.35 ml of 1% cyclopentadienylplatinum dichloride solution in methylene chloride, 75 ml of toluene and 70.52 mg of the aluminum salt of N-nitrosophenylhydroxylamine were added, and the mixture was stirred at 75° C. for 90 minutes. The solution was filtered, the solvent was removed, and the residue was freeze-dried, giving 59.5 g (85% of theory) of an organosiloxane (LC silicone 2) having a nematic phase between a glass transition temperature of 42° C. and a clearing point of 146° C.

This organosiloxane was used to produce, as described in Example 3, an aligned and crosslinked layer with a thickness of approximately 5 μm. Full alignment was achieved after heating at 90° C. for 15 minutes. Between crossed polarizing filters, the colorless and clear film exhibited clear optical anisotropy with a dark position on parallel alignment of the rubbing direction of the alignment layer with one of the polarization axes.

EXAMPLE 8

7.5 g of 4-methacryloyloxyphenyl allyloxybenzoate and 0.5% by weight of the photoinitiator Irgacure® 907 were admixed with a 25% solution of 50 g of the LC silicone 2 from Example 7 in toluene. The mixture was filtered and dried, giving 55 g of an organosiloxane mixture having a nematic phase between a glass transition temperature of 28° C. and a clearing point of 134° C., and a viscosity of 2.7 Pas at 90° C.

This organosiloxane was used to produce, as described in Example 3, an aligned and crosslinked layer with a thickness of approximately 5 μm. Full alignment was achieved after heating at 90° C. for 10 minutes. Between crossed polarizing filters, the colorless and clear film exhibited clear optical anisotropy with a dark position on parallel alignment of the rubbing direction of the alignment layer with one of the polarization axes. An optical path difference of 825 nm at a light wavelength of 633 nm was measured using the Senarmont method.

EXAMPLE 9

A mixture of 5.95 g (0.015 mol) of 1-(4-allyloxybenzoyloxy)-4-octanoyloxybenzene, 5.52 g (0.015 mol) of 1-(4-allyloxybenzoyloxy)-4-hexanoyloxybenzene, 5.74 g (0.015 mol) of 1-(4-allyloxybenzoyloxy)-4-heptanoyloxybenzene and 4.87 g (0.016 mol) of pentamethylcyclopentasiloxane were dissolved in 100 ml of toluene, and a 1% solution of cyclopentadienylplatinum dichloride in 0.15 ml of methylene chloride was added at 80° C. The solution was stirred at 105° C. for 45 minutes and then cooled to 60° C., and 10.15 g (0.03 mol) of 4-methacryloyloxyphenyl allyloxybenzoate, 0.15 ml of 1% cyclopentadienylplatinum dichloride solution in methylene chloride and 32 mg of the aluminum salt of N-nitrosophenylhydroxylamine were added, and the mixture was stirred at 75° C. for 90 minutes. The solution was filtered, the solvent was removed, and the residue was freeze-dried, giving 22.8 g (71% of theory) of an organosiloxane having a nematic phase between a glass transition temperature of 20° C. and a clearing point of 102° C.

This organosiloxane was used to produce, as described in Example 3, an aligned and crosslinked layer with a thickness of approximately 5 μm. Full alignment was achieved after heating at 88° C. for 5 minutes. Between crossed polarizing filters, the colorless and clear film exhibited clear optical anisotropy with a dark position on parallel alignment of the rubbing direction of the alignment layer with one of the polarization axes.

EXAMPLE 10

A mixture of 4.46 g (0.0113 mol) of 1-(4-allyloxybenzoyloxy)-4-octanoyloxybenzene, 4.14 g (0.0113 mol) of 1-(4-allyloxybenzoyloxy)-4-hexanoyloxybenzene, 4.30 g (0.0113 mol) of 1-(4-allyloxybenzoyloxy)-4-heptanoyloxybenzene, 4.28 g (0.0113 mol) of 1-(4-allyloxybenzoyloxy)-4-cyclohexanoylbenzene and 4.87 g (0.016 mol) of pentamethylcyclopentasiloxane were dissolved in 100 ml of toluene, and 0.15 ml of a 1% solution of cyclopentadienylplatinum dichloride in methylene chloride was added at 80° C. The solution was stirred at 105° C. for 45 minutes and then cooled to 60° C., and 10.15 g (0.03 mol) of 4-methacryloyloxyphenyl allyloxybenzoate, 0.15 ml of 1% cyclopentadienylplatinum dichloride solution in methylene chloride and 32 mg of the aluminum salt of N-nitrosophenylhydroxylamine were added, and the mixture was stirred at 75° C. for 90 minutes. The solution was filtered, the solvent was removed, and the residue was freeze-dried, giving 22.9 g (71% of theory) of an organosiloxane having a nematic phase between a glass transition temperature of 20° C. and a clearing point of 100° C., and a viscosity of 2.4 Pas at 90° C. This organosiloxane was used to produce, as described in Example 3, an aligned and crosslinked layer with a thickness of approximately 7 μm. Full alignment was achieved after heating at 88° C. for 12 minutes. Between crossed polarizing filters, the colorless and clear film exhibited clear optical anisotropy with a dark position on parallel alignment of the rubbing direction of the alignment layer with one of the polarization axes.

EXAMPLE 11

A mixture of 11.2 g (0.03 mol) of 1-(4-allyloxybenzoyloxy)-4-benzoyloxybenzene, 11.47 g (0.03 mol) of 1-(4-allyloxybenzoyloxy)-4-heptanoyloxybenzene, 11.89 g (0.032 mol) of 1-(4-allyloxybenzoyloxy)-4-hexanoyloxybenzene and 9.74 g (0.032 mol) of pentamethylcyclopentasiloxane were dissolved in 100 ml of toluene, and 0.28 ml of a 1% solution of cyclopentadienylplatinum dichloride in methylene chloride was added at 80° C. The solution was stirred at 105° C. for 45 minutes and then cooled to 60° C., and 20.30 g (0.06 mol) of 4-methacryloyloxyphenyl allyloxybenzoate, 0.28 ml of 1% cyclopentadienylplatinum dichloride solution in methylene chloride and 64 mg of the aluminum salt of N-nitrosophenylhydroxylamine were added, and the mixture was stirred at 75° C. for 90 minutes. The solution was filtered, the solvent was removed, and the residue was freeze-dried, giving 45.2 g (80% of theory) of an organosiloxane having a nematic phase between a glass transition temperature of 22° C. and a clearing point of 114° C.

The substance was dissolved in 100 ml of p-xylene, 9.04 g (0.028 mol) of 4-methacryloyloxyphenyl allyloxybenzoate and 0.5% by weight of the photoinitiator Irgacure® 907 were added, and the mixture was filtered and freeze-dried. The mixture had a nematic phase with a clearing point of 98° C.

This organosiloxane was used to produce, as described in Example 3, an aligned and crosslinked layer with a thickness of approximately 6 μm. Full alignment was achieved after heating at 90° C. for 2 minutes. Between crossed polarizing filters, the colorless and clear film exhibited clear optical anisotropy with a dark position on parallel alignment of the rubbing direction of the alignment layer with one of the polarization axes.

EXAMPLE 12

A mixture of 30.4 g (0.07 mol) of 1-(4-allyloxybenzoyloxy)-4-(4'-methoxybenzoyloxy)benzene, 27.7 g (0.07 mol) of 1-(4-allyloxybenzoyloxy)-4-hexanoyloxybenzene, 28.7 g (0.07 mol) of 1-(4-allyloxybenzoyloxy)-4-heptanoyloxybenzene and 24.4 g (0.08 mol) of pentamethylpentacyclosiloxane were dissolved in 500 ml of toluene, and 7.5 ml of a 1% solution of cyclopentadienylplatinum dichloride in methylene chloride were added at 80° C. The solution was stirred at 105° C. for 45 minutes and then cooled to 60° C., and 50.8 g (0.15 mol) of 4-methacryloyloxyphenyl allyloxybenzoate, 750 ml of 1% cyclopentadienylplatinum dichloride solution in methylene chloride and 160 mg of the aluminum salt of N-nitrosophenylhydroxylamine were added, and the mixture was stirred at 75° C. for 90 minutes. The solution was filtered, the solvent was removed, and the residue was freeze-dried, giving 128 g (80% of theory) of an organosiloxane (LC silicone 3) having a nematic phase between a glass transition temperature of 25° C. and a clearing point of 139° C., and a viscosity of 3.6 Pas at 90° C.

EXAMPLE 13

12.8 g of the LC silicone 3 from Example 12 were dissolved in 100 ml of p-xylene, and 2.6 g of 4-methacryloyloxyphenyl allyloxybenzoate and 0.5% by weight of the photoinitiator Irgacure® 907 were added. Filtration and freeze-drying of the solution gave 14 g of an organosiloxane mixture (LC silicone 4) having a nematic phase between a glass transition temperature of 7° C. and a clearing point of 130° C., and a viscosity of 0.6 Pas at 90° C.

Two glass plates were each provided with a polyvinyl alcohol alignment layer which had been rubbed unidirectionally with a velvet cloth. 0.2 g of the organosiloxane mixture was applied at 100° C. to the alignment layer of one of the glass plates and covered with the second plate in such a way that the rubbing directions were opposite and parallel. By means of even pressure on the plates, the mixture was distributed until an approximately 10 μm thick film remained between the alignment layers. The film was heated at 100° C. for 4 minutes until all the disclination lines had disappeared. It was subsequently polymerized by irradiation with UV-A light (approximately 100 mW/cm² for 15 seconds). The resultant colorless and clear film exhibited an optical path difference of 1430 nm at a light wavelength of 633 nm using the Séenarmont method. The mean refractive index of the film was measured at 1.57 in an Abbe refractometer.

EXAMPLE 14

A further 12.8 g of the LC silicone 3 from Example 12 were dissolved in 100 ml of p-xylene, and 3.2 g of 4-ethylphenyl 4-methacryloyloxybenzoate and 0.5% by car weight of the photoinitiator Irgacure® 907 were added. Filtration and freeze-drying of the solution gave 15 g of a nematic organosiloxane mixture having a clearing point of 102° C.

This organosiloxane was used to produce, as described in Example 3, an aligned and crosslinked layer with a thickness of approximately 7 μm. Full alignment was achieved after heating at 90° C. for 1 minute. Between crossed polarizing filters, the colorless and clear film exhibited clear optical anisotropy with a dark position on parallel alignment of the rubbing direction of the alignment layer with one of the polarization axes.

EXAMPLE 15

Comparative Example

A liquid-crystalline organosiloxane according to Example 3, lines 40–59, of U.S. Pat. No. 5,610,258 (containing three trinuclear and one binuclear mesogen having a glass transition temperature of 30° C. and a clearing point of 172° C.) were applied, as described in Example 3, at 90° C. between two glass plates having alignment layers in such a way that a film with a thickness of approximately 5 μm was formed. Heating at 90° C. for 20 minutes did not produce a homogeneous planar alignment. The film was hazy due to a large number of disclination lines at which the light was scattered. Between crossed polarizing filters, the film exhibited optical anisotropy, but a distinct dark position was not achieved by parallel alignment of the polarization axes with the rubbing direction of the alignment layer.

EXAMPLE 16

1.5 g of the LC silicone 4 from Example 13 were dissolved in 6 g of toluene and applied by spin coating to a glass plate having a polyvinyl alcohol alignment layer which had previously been rubbed unidirectionally with a velvet cloth. Drying and alignment for 10 minutes in a vacuum drying cabinet at 90° C. gave a film with a thickness of about 0.6 μm, which was subsequently polymerized by irradiation with UV-A light (approximately 100 mW/cm$^2$ for 15 seconds). Between crossed polarizing filters, the colorless and clear film exhibited distinct optical anisotropy with a dark position on parallel alignment of the rubbing direction of the alignment layer with one of the polarization axes, as produced by hybrid alignment of the mesogens in a plane defined by the perpendicular to the film plane and the rubbing direction of the alignment layer and having a mean tilt angle of 20° relative to the film plane.

The angle dependence of the optical retardation of a helium-neon laser beam was measured using the Sénarmont method in the angle range from 0° to 360° in 10° steps in a plane defined by the perpendicular to the film plane and the rubbing direction of the alignment layer. To this end, the sample was rotated about an axis in the film plane perpendicular to the rubbing direction. The retardation perpendicular to the film plane was 68 nm, and the retardation at an angle of incidence of 40° to the perpendicular was 84 nm, and the retardation at −40° was 46 nm.

EXAMPLE 17

2 g of the LC silicone 4 from Example 13 were dissolved in 8 g of toluene and applied to a cellulose triacetate film (Triphan®, manufacturer: Lonza) with no inherent optical anisotropy by means of a chamber-type doctor blade having a gap width of 30 μm on a drawing machine. Drying and alignment for 20 minutes in a vacuum drying cabinet at 90° C. gave a film with a thickness of about 5 μm which was subsequently polymerized by irradiation with UV-A light (approximately 100 mW/cm$^2$ for 15 seconds). Between crossed polarizing filters, the colorless and clear film exhibited distinct optical anisotropy with a dark position on parallel alignment of the rubbing direction of the alignment layer with one of the polarization axes.

EXAMPLE 18

8.6 g of the LC silicone 3 from Example 12 were dissolved in 100 ml of p-xylene, and 1.8 g of 4-methacryloyloxyphenyl allyloxybenzoate, 0.1 g of methacrylic acid cholesterol ester and 0.5% by weight of the photoinitiator Irgacure® 907 were added. Filtration and freeze-drying of the solution gave 9 g of an organosiloxane mixture (LC silicone 5).

Two glass plates were each provided with a polyvinyl alcohol alignment layer which had been rubbed unidirectionally with a velvet cloth. 0.1 g of the organosiloxane mixture was applied at 100° C. to the alignment layer of one of the glass plates and covered with the second plate in such a way that the rubbing directions were perpendicular to one another. By means of even pressure on the plates, the mixture was distributed until a film with a thickness of approximately 9 μm remained between the alignment layers. The film was heated at 100° C. for 4 minutes until all the disclination lines had disappeared and was subsequently polymerized by irradiation with UV-A light (approximately 100 mW/cm$^2$ for 15 seconds). Between crossed polarizing filters, the resultant colorless and clear film exhibited distinct optical anisotropy with a bright position on parallel alignment of the rubbing direction of the alignment layer with one of the polarization axes. Between parallel polarizing filters, a dark position was observed on parallel alignment of the rubbing direction of the alignment layer with one of the polarization axes. The rotated alignment of the mesogens in this layer corresponds to the alignment in a TN-LCD without an electric field.

EXAMPLE 19

12.8 g of the LC silicone 3 from Example 12 were dissolved in 100 ml of p-xylene, and 2.6 g of 4-methacryloyloxyphenyl allyloxybenzoate, 0.82 g of isosorbide bis(4-allyloxybenzoate) and 1% by weight of the photoinitiator Irgacure® 907 were added. Filtration and freeze-drying of the solution gave 15 g of an organosiloxane mixture (LC silicone 6). Two glass plates were each provided with a polyvinyl alcohol alignment layer which had been rubbed unidirectionally with a velvet cloth. 0.1 g of the organosiloxane mixture was applied at 90° C. to the alignment layer on one of the glass plates and covered with the second plate in such a way that the rubbing directions were perpendicular to one another. By means of even pressure on the plates, the mixture was distributed until a film with a thickness of approximately 12 μm remained between the alignment layers. The film was heated at 80° C. for 5 minutes until all disclination lines had disappeared and was subsequently polymerized by irradiation with UV-A light (approximately 100 mW/cm$^2$ for 15 seconds). In a photo-spectrometer fitted with circular polarizers, the light transmitted and reflected by the film produced in this way, which was clear and colorless when viewed perpendicularly, was measured. Selective reflection of left-handed helical IR radiation at wavelength 761 nm was found. The half-value width of the reflection band was 72 nm.

EXAMPLE 20

12.8 g of the LC silicone 3 from Example 12 were dissolved in 100 ml of p-xylene, and 2.6 g of 4-methacryloyloxyphenyl allyloxybenzoate, 0.82 g of isomannide bis(4-allyloxybenzoate) and 1% by weight of the photoinitiator Irgacure® 907 were added. Filtration and freeze-drying of the solution gave 15 g of an organosiloxane mixture.

Two glass plates were each provided with a polyvinyl alcohol alignment layer which had been rubbed unidirectionally with a velvet cloth. 0.1 g of the organosiloxane mixture was applied at 90° C. to the alignment layer on one of the glass plates and covered with the second plate in such a way that the rubbing directions were perpendicular to one another. By means of even pressure on the plates, the mixture was distributed until a film with a thickness of approximately 11 μm remained between the alignment layers. The film was heated at 80° C. for 10 minutes and was subsequently polymerized by irradiation with UV-A light (approximately 100 mW/cm² for 15 seconds).

In a photospectrometer fitted with circular polarizers, the light transmitted and reflected by the film produced in this way, which was clear and colorless, was measured. Selective reflection of right-handed helical IR radiation at wavelength 1283 nm was found. The half-value width of the reflection band was 125 nm.

EXAMPLE 21

20.5 g (0.054 mol) of 1-(4-allyloxybenzoyloxy)-4-cyclohexanoyloxybenzene, 3.3 g (0.008 mol) of 2-(4-allyloxybenzoyl)-5-(4-methylbenzoyl)isosorbide and 10.0 g (0.039 mol) of tetramethyltetracyclosiloxane were dissolved in 500 ml of toluene, and 200 ppm by weight of cyclopentadienylplatinum dichloride, based on tetramethyltetracyclosiloxane, were added at 100° C. The solution was stirred at 110° C. for 120 minutes and then cooled to 20° C., and 32.2 g (0.095 mol) of 4-methacryloyloxyphenyl allyloxybenzoate, 300 ppm by weight of cyclopentadienylplatinum dichloride, based on tetramethyltetracyclosiloxane, and 0.22 g of the aluminum salt of N-nitrosophenylhydroxylamine were added. The mixture was stirred at 75° C. for 4 hours, and the product was precipitated from the cooled reaction solution once using petroleum ether and once using ethanol. The precipitate was dried, giving 33.5 g (51% of theory) of an organosiloxane having a cholesteric phase between a glass transition temperature of 27° C. and a clearing point of 88° C. 10 g of the organosiloxane were dissolved in 100 ml of p-xylene, and 1% by weight of the photoinitiator Irgacure® 907 were added. Filtration and freeze-drying of the solution gave 9 g of an organosiloxane mixture.

Two glass plates were each provided with a polyvinyl alcohol alignment layer which had been rubbed unidirectionally with a velvet cloth. 0.2 g of the organosiloxane mixture was applied at 90° C. to the alignment layer on one of the glass plates and covered with the second plate in such a way that the rubbing directions were perpendicular to one another. By means of even pressure on the plates, the mixture was distributed until a film with a thickness of approximately 10 μm remained between the alignment layers. The film was heated at 80° C. for 10 minutes and subsequently polymerized by irradiation with UV-A light (approximately 100 mW/cm² for 15 seconds).

In a photospectrometer fitted with circular polarizers, the light transmitted and reflected by the film produced in this way, which was clear and colorless when viewed perpendicularly, was measured. Selective reflection of left-handed helical IR radiation at wavelength 945 nm was found. The half-value width of the reflection band was 93 nm.

EXAMPLE 22

10 g of the LC silicone 6 were used to produce, as described in Example 19, an aligned and polymerized film with a thickness of about 12 μm. The glass plates were separated from one another, and the LC silicone film was scraped off from the glass substrate using a steel razor blade. The particles remaining were ground in a universal bench mill to a mean particle diameter of about 50 μm. The pulverulent fraction obtained in this way was subsequently screened using an analytical screen having a mesh width of 50 μm and then incorporated into a conventional alkyd-melamine resin binder system (commercially available as Sacolyd® F 410/Sacopal® M 110 from Kolms Chemie, Krems, Austria). The viscosity of the binder system was adjusted, using a diluent (mixture of aromatic hydrocarbons and methyl isobutyl ketone), to a flow time of about 80 seconds in a DIN 4 flow cup.

The resultant mixture of LC plates and binder was coated onto a black/white paper (BYK Gardner) in a wet-film thickness of 120 μm using a film drawing machine (Erichsen). The paper was subsequently dried at 80° C. for one hour. After drying, the paper surface stayed black and white. In a photospectrometer fitted with circular polarizers, the light reflected at an angle of 10° to the paper surface perpendicular was measured. Selective reflection of left-handed helical IR radiation at wavelength 750 nm was found.

What is claimed is:

1. A nematic organosiloxane (F) having at least two mesogenic side groups, of which at most one has three nuclei and all the others have two nuclei, where the term nucleus is taken to mean a six-membered ring or a bicyclic system consisting of six-membered rings, and where at least one of the mesogenic side groups contains a methacryloyl or acryloyl group.

2. A nematic organosiloxane (F) having at least two mesogenic side groups, of which at most one has three nuclei and all the others have two nuclei, where the term nucleus means a six-membered ring or a bicyclic system consisting of six-membered rings, and where at least one of the mesogenic side groups contains a methacryloyl or acryloyl group, in which the proportion of mesogenic side groups containing methacryloyl or acryloyl groups is at least 10 mol % based on total mols of mesogenic side groups.

3. An organosiloxane (F) as claimed in claim 1, which contains at least two units of the general formula (I)

$$[MR^1_p SiO_{q/2}] \quad (1)$$

in which either p=1 and q=2 or p=2 and q=1, $R^1$ is a $C_1$- to $C_{10}$-hydrocarbon radical, and in which M is a mesogenic side group of the general formula (2)

$$R^2-X^1-(A^1-X^2)_a-R^3-A^2 \quad (2)$$

where, in the above formula (2), $R^2$ is a radical of the formula $(CH_2)_n$, where n is an integer having a value of from 2 to 10 and in which one or more methylene units which are not adjacent to one another may be replaced by oxygen atoms or dimethylsilyl radicals, $R^3$ is a chemical bond or a radical of the formula $(CH_2)_m$, where m is an integer having a value of from 1 to 12, in which one or more methylene units which are not adjacent to one another may be replaced by oxygen atoms or dimethylsilyl radicals, $X^1$ is a chemical bond or is a divalent radical selected from the group consisting of —O—, —COO— and —OCO—, $X^2$ are identical or different linking groups individually selected from the group consisting of a chemical bond and divalent radicals —COO—, —OCO—, —CH$_2$CH$_2$—, —CH=N—, —N=CH—, —N=N—, —CONH—, —HN(O)C—, —C≡C—, —CH=CH—, —N=N(O)— and —N(O)=N—, A$^1$ are identical or different nuclei which are divalent radicals individually selected from the group consisting of 1,4-phenylene, 1,4-cyclohexylene, 2,5-pyridinylene, 2,5-pyranylene, 2,5-pyrimidinylene, 5,2-pyrimidinylene, 2,5-(1,3-dioxanylene), 5,2(1,3-dioxanylene), 2,6-naphthylidene, 2,7-naphthylidene and 1,4-naphthylidene, A$^2$ is an end group which is selected from the group consisting of hydrogen atoms, halogen atoms, hydroxyl, phenyl, acryloyloxy, (meth)acryloyloxy, (meth)acrylethyleneoxy, cyclohexyl and C$_1$- to C$_{10}$-alkenyl radicals, in which one or more methylene units which are not adjacent to one another may be replaced by oxygen atoms or dimethylsilyl radicals, and a can adopt a value of 2 or 3.

4. An organosiloxane (F) as claimed in claim 2, which contains at least two units of the general formula (I)

$$[MR^1_p SiO_{q/2}] \quad (1)$$

in which either p=1 and q=2 or p=2 and q=1,

R$^1$ is a C$_1$- to C$_{10}$-hydrocarbon radical, and in which

M is a mesogenic side group of the general formula (2)

$$R^2-X^1-(A^1-X^2)_a-R^3-A^2 \quad (2)$$

where, in the above formula (2),

R$^2$ is a radical of the formula (CH$_2$)$_n$, where n is an integer having a value of from 2 to 10 and in which one or more methylene units which are not adjacent to one another may be replaced by oxygen atoms or dimethylsilyl radicals, R$^3$ is a chemical bond or a radical of the formula (CH$_2$)$_m$, where m is an integer having a value of from 1 to 12, in which one or more methylene units which are not adjacent to one another may be replaced by oxygen atoms or dimethylsilyl radicals, X$^1$ is a chemical bond or is a divalent radical selected from the group consisting of —O—, —COO— and —OCO—, X$^2$ are identical or different linking groups individually selected from the group consisting of a chemical bond and divalent radicals —COO—, —OCO—, —CH$_2$CH$_2$—, —CH=N—, —N=CH—, —N=N—, —CONH—, —HN(O)C—, —C≡C—, —CH=CH—, —N=N(O)— and —N(O)=N—, A$^1$ are identical or different nuclei which are divalent radicals individually selected from the group consisting of 1,4-phenylene, 1,4-cyclohexylene, 2,5-pyridinylene, 2,5-pyranylene, 2,5-pyrimidinylene, 5, 2-pyrimidinylene, 2,5-(1,3-dioxanylene), 5,2(1,3-dioxanylene), 2,6-naphthylidene, 2,7-naphthylidene and 1,4-naphthylidene, A$^2$ is an end group which is selected from the group consisting of hydrogen atoms, halogen atoms, hydroxyl, phenyl, acryloyloxy, (meth)acryloyloxy, (meth)acrylethyleneoxy, cyclohexyl and C$_1$- to C$_{10}$-alkenyl radicals, in which one or more methylene units which are not adjacent to one another may be replaced by oxygen atoms or dimethylsilyl radicals, and a can adopt a value of 2 or 3.

5. An organosiloxane (F) as claimed in claim 3, which contains units of the formulae R$^1_2$Si and, optionally, R$^1_3$Si.

6. An organosiloxane (F) as claimed in claim 4, which contains units of the formulae R$^1_2$Si and, optionally, R$^1_3$Si.

7. An organosiloxane (F) as claimed in claim 1, which contains from 2 to 15 silicon atoms.

8. An organosiloxane (F) as claimed in claim 2, which contains from 2 to 15 silicon atoms.

9. An organosiloxane (F) as claimed in claim 3, which contains from 2 to 15 silicon atoms.

10. An organosiloxane (F) as claimed in claim 5, which contains from 2 to 15 silicon atoms.

11. An organosiloxane (F) as claimed in claim 1, in which one mesogenic side group contains three nuclei.

12. An organosiloxane (F) as claimed in claim 2, in which one mesogenic side group contains three nuclei.

13. An organosiloxane (F) as claimed in claim 3, in which one mesogenic side group contains three nuclei.

14. An organosiloxane (F) as claimed in claim 5, in which one mesogenic side group contains three nuclei.

15. An organosiloxane (F) as claimed in claim 1, which contains mesogenic side groups of the general formula (3)

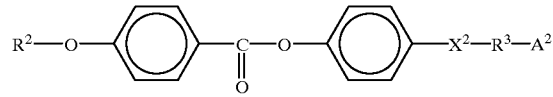

(3)

where

R$^2$ is a radical of the formula (CH$_2$)$_n$, where n is an integer having a value of from 2 to 10 and in which one or more methylene units which are not adjacent to one another may be replaced by oxygen atoms or dimethylsilyl radicals, R$^3$ is a chemical bond or a radical of the formula (CH$_2$)$_m$, where m is an integer having a value of from 1 to 12, in which one or more methylene units which are not adjacent to one another may be replaced by oxygen atoms or dimethylsilyl radicals, X$^2$ are identical or different linking groups individually selected from the group consisting of a chemical bond and divalent radicals —COO—, —OCO—, —CH$_2$CH$_2$—, —CH=N—, —N=CH—, —N=N—, —CONH—, —HN(O)C—, —C≡C—, —CH=CH—, —N=N(O)— and —N(O)=N—, and A$^2$ is an end group which is selected from the group consisting of hydrogen atoms, halogen atoms, hydroxyl, phenyl, acryloyloxy, (meth)acryloyloxy, (meth)acrylethyleneoxy, cyclohexyl and C$_1$- to C$_{10}$-alkenyl radicals, in which one or more methylene units which are not adjacent to one another may be replaced by oxygen atoms or dimethylsilyl radicals.

16. An organosiloxane (F) as claimed in claim 2, which contains mesogenic side groups of the general formula (3)

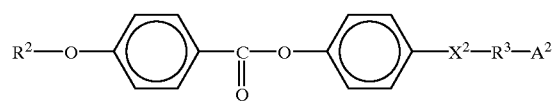

(3)

where

R$^2$ is a radical of the formula (CH$_2$)$_n$, where n is an integer having a value of from 2 to 10 and in which one or more methylene units which are not adjacent to one another may be replaced by oxygen atoms or dimethylsilyl radicals, R³ is a chemical bond or a radical of the formula $(CH_2)_m$, where m is an integer having a value of from 1 to 12, in which one or more methylene units which are not adjacent to one another may be replaced by oxygen atoms or dimethylsilyl radicals, X² are identical or different linking groups individually selected of from the group consisting of a chemical bond and divalent radicals —COO—, —OCO—, —CH₂CH₂—, —CH=N—, —N=CH—, —N=N—, —CONH—, —HN(O)C—, —C≡C—, —CH=CH—, —N=N(O)— and —N(O)=N—, and A² is an end group which is selected from the group consisting of hydrogen atoms, halogen atoms, hydroxyl, phenyl, acryloyloxy, (meth)acryloyloxy, (meth)acrylethyleneoxy, cyclohexyl and $C_1$- to $C_{10}$-alkenyl radicals, in which one or more methylene units which are not adjacent to one another may be replaced by oxygen atoms or dimethylsilyl radicals.

17. An organosiloxane (F) as claimed in claim 3, which contains mesogenic side groups of the general formula (3)

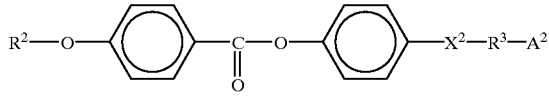

(3)

where

R² is a radical of the formula $(CH_2)_n$, where n is an integer having a value of from 2 to 10 and in which one or more methylene units which are not adjacent to one another may be replaced by oxygen atoms or dimethylsilyl radicals, R³ is a chemical bond or a radical of the formula $(CH_2)_m$, where m is an integer having a value of from 1 to 12, in which one or more methylene units which are not adjacent to one another may be replaced by oxygen atoms or dimethylsilyl radicals, X² are identical or different linking groups individually selected from the group consisting of a chemical bond and divalent radicals —COO—, —OCO—, —CH₂CH₂—, —CH=N—, —N=CH—, —N=N—, —CONH—, —HN(O)C—, —C≡C—, —CH=CH—, —N=N(O)— and —N(O)=N—, and A² is an end group which is selected from the group consisting of hydrogen atoms, halogen atoms, hydroxyl, phenyl, acryloyloxy, (meth)acryloyloxy, (meth)acrylethyleneoxy, cyclohexyl and $C_1$- to $C_{10}$-alkenyl radicals, in which one or more methylene units which are not adjacent to one another may be replaced by oxygen atoms or dimethylsilyl radicals.

18. An organosiloxane (F) as claimed in claim 5, which contains mesogenic side groups of the general formula (3)

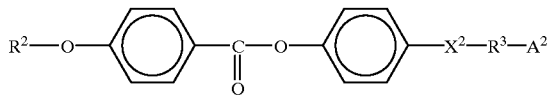

(3)

where

R² is a radical of the formula $(CH_2)_n$, where n is an integer having a value of from 2 to 10 and in which one or more methylene units which are not adjacent to one another may be replaced by oxygen atoms or dimethylsilyl radicals, R³ is a chemical bond or a radical of the formula $(CH_2)_m$, where m is an integer having a value of from 1 to 12, in which one or more methylene units which are not adjacent to one another may be replaced by oxygen atoms or dimethylsilyl radicals, X² are identical or different linking groups individually selected from the group consisting of a chemical bond and divalent radicals —COO—, —OCO—, —CH₂CH₂—, —CH=N—, —N=CH—, —N=N—, —CONH—, —HN(O)C—, —C≡C—, —CH=CH—, —N=N(O)— and —N(O)=N—, and A² is an end group which is selected from the group consisting of hydrogen atoms, halogen atoms, hydroxyl, phenyl, acryloyloxy, (meth)acryloyloxy, (meth)acrylethyleneoxy, cyclohexyl and $C_1$- to $C_{10}$-alkenyl radicals, in which one or more methylene units which are not adjacent to one another may be replaced by oxygen atoms or dimethylsilyl radicals.

19. A process for the preparation of an organosiloxane (F) as claimed in claim 1, in which organosiloxanes containing at least two silicon atoms to which hydrogen atoms are bonded directly are reacted with alkenes, of which alkenes at most one contains three nuclei and all the others have two nuclei, where the term nucleus is taken to mean a six-membered ring or a bicyclic system consisting of six-membered rings, and where at least one of the alkenes contains a methacryloyl or acryloyl group.

20. In the production of optically anisotropic layers, the improvement comprising depositing as at least one layer, the organosiloxane (F) of claim 1.

21. A nematic organosiloxane (F) having at least two mesogenic side groups, of which one and only one of said mesogenic side groups has three nuclei and all the others have two nuclei, where the term nucleus is taken to mean a six-membered ring or a bicyclic system consisting of six-membered rings, and where at least one of the mesogenic side groups contains a methacryloyl or acryloyl group.

22. An organosiloxane (F) as claimed in claim 21, in which the proportion of mesogenic side groups containing methacryloyl or acryloyl groups is at least 10%.

23. An organosiloxane (F) as claimed in claim 21, which contains at least two units of the general formula (I)

$$[MR^1_p SiO_{q/2}] \qquad (1)$$

in which either p=1 and q=2 or p=2 and q=1,

R¹ is a $C_1$- to $C_{10}$-hydrocarbon radical, and in which

M is a mesogenic side group of the general formula (2)

(2)

where, in the above formula (2),

R² is a radical of the formula $(CH_2)_n$, where n is an integer having a value of from 2 to 10 and in which one or more methylene units which are not adjacent to one another may be replaced by oxygen atoms or dimethylsilyl radicals, R³ is a chemical bond or a radical of the formula $(CH_2)_m$, where m is an integer having a value of from 1 to 12, in which one or more methylene units which are not adjacent to one another may be replaced by oxygen atoms or dimethylsilyl radicals, X¹ is a chemical bond or is a divalent radical selected from the group consisting of —O—, —COO— and —OCO—, X² are identical or different linking groups individually selected from the group consisting of a chemical bond and divalent radicals —COO—, —OCO—, —CH$_2$CH$_2$—, —CH=N—, —N=CH—, —N=N—, —CONH—, —HN(O)C—, —C≡C—, —CH=CH—, —N=N(O)— and —N(O)=N—, A$^1$ are identical or different nuclei which are divalent radicals individually selected from the group consisting of 1,4-phenylene, 1,4-cyclohexylene, 2,5-pyridinylene, 2,5-pyranylene, 2,5-pyrimidinylene, 5,2-pyrimidinylene, 2,5-(1,3-dioxanylene), 5,2(1,3-dioxanylene), 2,6-naphthylidene, 2,7-naphthylidene and 1,4-naphthylidene, A$^2$ is an end group which is selected from the group consisting of hydrogen atoms, halogen atoms, hydroxyl, phenyl, acryloyloxy, (meth)acryloyloxy, (meth)acrylethyleneoxy, cyclohexyl and C$_1$- to C$_{10}$-alkenyl radicals, in which one or more methylene units which are not adjacent to one another may be replaced by oxygen atoms or dimethylsilyl radicals, and a can adopt a value of 2 or 3.

24. An organosiloxane (F) as claimed in claim 23, which contains units of the formulae R$^1_2$Si and, optionally, R$^1_3$Si.

* * * * *